(12) United States Patent
Zucker

(10) Patent No.: US 7,320,845 B2
(45) Date of Patent: Jan. 22, 2008

(54) PRINTED BATTERY

(75) Inventor: Jerry Zucker, Charleston, SC (US)

(73) Assignee: The InterTech Group, Inc., North Charleston, SC (US)

( * ) Notice: Subject to any disclaimer, the term of this patent is extended or adjusted under 35 U.S.C. 154(b) by 452 days.

(21) Appl. No.: 10/155,253

(22) Filed: May 24, 2002

(65) Prior Publication Data

US 2003/0219648 A1    Nov. 27, 2003

(51) Int. Cl.
*H01M 6/40*    (2006.01)
(52) U.S. Cl. .................. 429/124; 29/623.1
(58) Field of Classification Search .............. 429/124, 429/127, 162; 29/623.1–623.4
See application file for complete search history.

(56) References Cited

U.S. PATENT DOCUMENTS

| 2,688,649 A | 9/1954 | Bjorksten |
| 5,019,467 A | 5/1991 | Fujiwara |
| 5,558,957 A | 9/1996 | Datta et al. |
| 5,652,043 A | 7/1997 | Nitzan |
| 5,747,191 A | 5/1998 | Lake |
| 5,865,859 A | 2/1999 | Lake |
| 6,045,942 A | 4/2000 | Miekka et al. |
| 6,369,793 B1 | 4/2002 | Parker |
| 6,379,835 B1 | 4/2002 | Kucherovsky et al. |
| 6,395,043 B1 | 5/2002 | Shadle et al. |
| 2003/0165744 A1* | 9/2003 | Schubert et al. ............ 429/303 |

FOREIGN PATENT DOCUMENTS

WO    WO 00/11743 A1    3/2000

OTHER PUBLICATIONS

Linden. Handbook of Batteris, 2$^{nd}$ edition, pp. 1.3-1.4, 1995.*
Declaration under 37 CFR 1.132 submitted by Applicant to the Examiner during an interview on Oct. 5, 2007.*

* cited by examiner

*Primary Examiner*—Tracy Dove
(74) *Attorney, Agent, or Firm*—Hammer & Hanf, P.C.

(57) ABSTRACT

A printed battery has a flexible backing sheet, a first conductive layer printed on said sheet; a first electrode printed on the first conductive layer; a second electrode layer printed on said first electrode layer; and a second conductive layer printed on said second electrode layer.

11 Claims, 1 Drawing Sheet

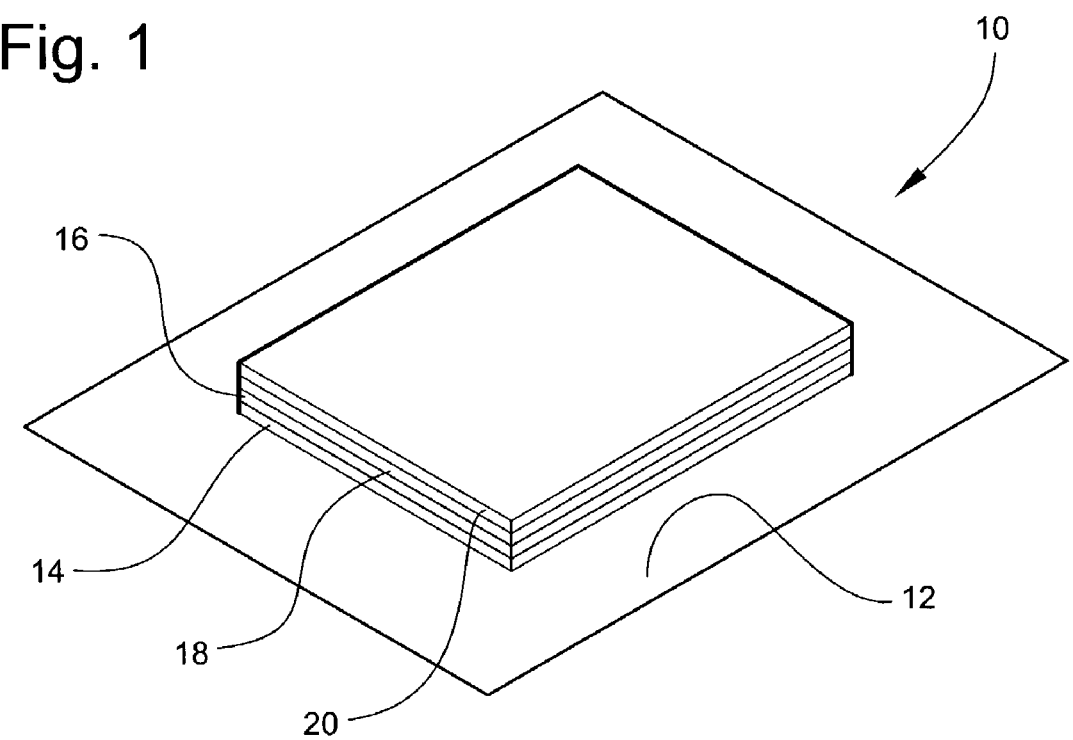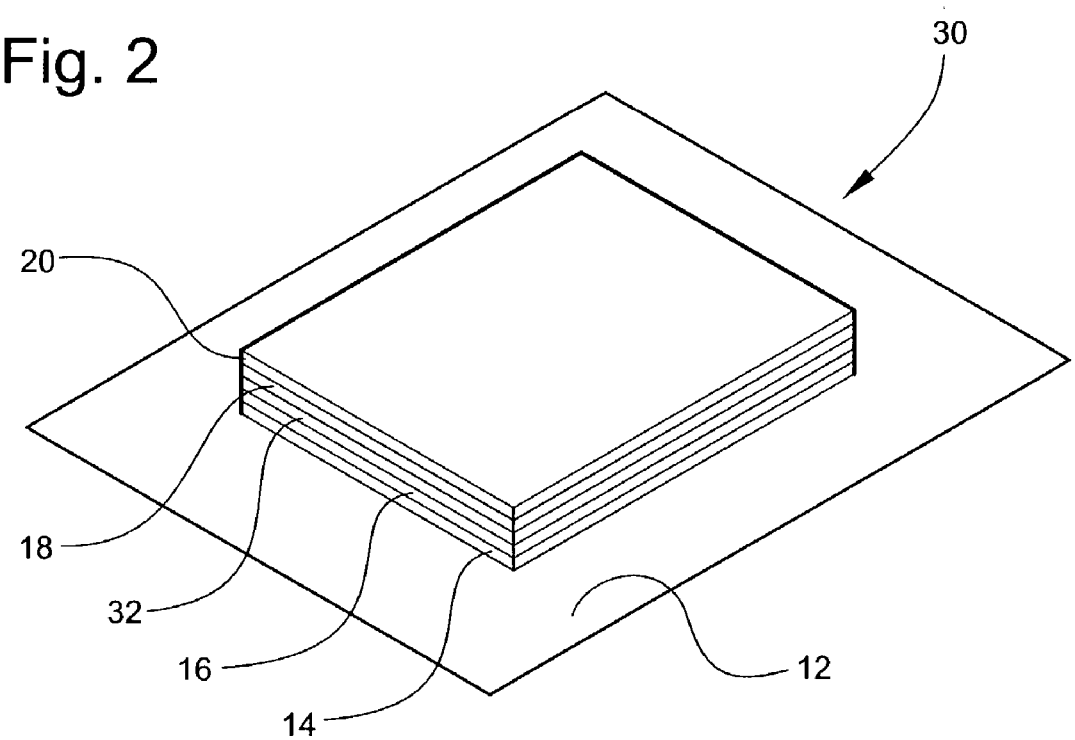

PRINTED BATTERY

FIELD OF THE INVENTION

This invention is directed to a thin, flexible battery in which all active components are printed.

BACKGROUND OF THE INVENTION

Thin, flexible batteries, in which some but not all of the components are printed, are known. For example, in U.S. Pat. No. 5,652,043, a thin flexible battery is made by printing some of the components. This battery is not completely printed because it requires a porous insoluble substance as part of its aqueous electrolyte layer. That aqueous electrolyte layer comprises a deliquescent material, an electro-active soluble material and adhesive (or water soluble polymer) for binding the electrodes to the electrolyte layer, and the porous insoluble substance. The porous insoluble substance is described as filter paper, plastic membrane, cellulose membrane, and cloth. The negative and positive electrodes are then printed on either side of the electrolyte layer. Conductive layers of graphite paper or carbon cloth may be added over the electrolytes. Terminals, applied by printing, may be included in the battery.

U.S. Pat. No. 5,019,467 discloses a flexible battery comprising a flexible insulating material, a positive current collection layer, a positive active layer, a solid polyelectrolyte layer, and a thin metallic film layer as the anode. In this battery, the positive current collection layer, positive active layer, and solid polymer electrolyte layer are coated on the flexible insulating material. The thin metallic layer is formed by vacuum deposition, sputtering, ion-plating, or non-electrolytic plating (i.e., not printed).

U.S. Pat. No. 5,747,191 discloses that polymer film inks may be used to form a conductive layer (current collector) for a thin flexible battery. This battery, however, requires an anode foil, which is formed by "wave-soldering-like" method.

In U.S. Pat. No. 5,558,957, a thin flexible battery requires the use of metal foils to form the current collectors, and anode and cathode layers.

There is a need for a relatively inexpensive, thin, flexible battery with a low energy density. Such a battery could be used in transdermal delivery systems for pharmaceuticals to provide an additional driving force to facilitate the diffusion of the drug across the skin. Such a battery could be used in a skin sensor, such as those used to monitor blood sugar levels or control insulin pumps. These batteries could be used to power smart (transmitting) baggage tags, ID's, and the like. Such a battery could also be used to power certain novelty devices such as greeting cards.

Accordingly, there is a need for relatively inexpensive, thin, flexible, disposable low energy density battery.

SUMMARY OF THE INVENTION

A printed battery comprising a flexible backing sheet, a first conductive layer printed on said sheet; a first electrode layer printed on the first conductive layer; a second electrode layer printed on said first electrode layer; and a second conductive layer printed on said second electrode layer.

A method of making a printed battery comprises the steps of: printing a first conductive layer on a flexible backing sheet; printing a first electrode layer on the first conductive layer; printing a second electrode layer on the first electrode layer; and printing a second conductive layer on the second electrode layer.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1 illustrates a first embodiment of the printed battery.

FIG. 2 illustrates a second embodiment of the printed battery.

DESCRIPTION OF THE INVENTION

Referring to the drawings, wherein like numerals indicate like elements, there is shown in FIG. 1 a first embodiment of the printed battery 10. Printed battery 10 includes a flexible substrate 12. A first conductive layer 14 is printed on substrate 12. A first electrode layer 16 is then printed on first conductive layer 14. A second electrode layer 18 is then printed on the first electrode layer. Finally, a second conductive layer 20 is printed on the second electrode layer 18.

In FIG. 2, a second embodiment of the printed battery 30 is illustrated. Printed battery 30 is substantially the same as printed battery 10 except that a separator/electrolyte layer 32 has been printed between the first electrode layer 16 and the second electrode layer 18.

In the printed battery, the current collectors or conductive layers 14, 20, the first and second electrode layers 16, 18, and the separator/electrolyte layer 32 are each printed onto the flexible substrate 12. Printing is a process of transferring with machinery an ink to a surface. Printing processes include screen-printing, stenciling, pad printing, offset printing, jet printing, block printing, engraved roll printing, flat screen-printing, rotary screen-printing, and heat transfer type printing.

Printing inks are a viscous to semi-solid suspension of finely divided particles. The suspension may be in a drying oil or a volatile solvent. The inks are dried in any conventional manner, e.g., catalyzed, forced air or forced hot air. Drying oils include, but are not limited to: linseed oil, alkyd, phenol-formaldehyde, and other synthetic resins and hydrocarbon emulsions. Suitable inks may have an acrylic base, an alkyd base, alginate base, latex base, or polyurethane base. The acrylic based inks are preferred. In these inks, the active material (finely divided particles discussed below) and the ink base are mixed. For example, in the conductive layers, an electrically conductive carbon and the ink base are mixed. Preferably, the conductive carbon comprises at least 60% by weight of the ink, and most preferably, at least 75%. Preferred carbons have particle sizes less than or equal to 0.1 micron.

The battery chemistry used is not limited. Exemplary chemistries include, but are not limited to: Leclanché (zinc-anode, manganese dioxide-cathode), Magnesium (Mg-anode, $MnO_2$-cathode), Alkaline $MnO_2$ (Zn-anode, $MnO_2$-cathode), Mercury (Zn-anode, HgO-cathode), Mercad (Cd-anode, $Ag_2O$-cathode), and Li/$MnO_2$ (Li-anode, $MnO_2$-cathode). Particles of the anode material are mixed into the ink base. The anode active materials are preferably selected from the group consisting of zinc, magnesium, cadmium, and lithium. The anode particles comprise at least 80% by weight of the ink; preferably, at least 90%; and most preferred, at least 95%. The anode particle sizes are, preferably, less than or equal to 0.5 micron. Particles of the cathode material are mixed into the ink base. The cathode active materials are preferably selected from the group consisting of manganese dioxide, mercury oxide, silver oxide and other electro-active oxides. The cathode particles comprise at least 80% by weight of the ink base; preferably, at least 90%; and most preferred, at least 95%. The cathode particle sizes are, preferably, less than or equal to 0.5 micron.

A separator may be interposed between the electrodes. The separator is used to facilitate ion conduction between the anode and the cathode and to separate the anode form the cathode. The separator includes electrolyte salts and a matrix material. The electrolyte salts are dictated by the choice of battery chemistry, as is well known. The matrix material must not unduly hinder ion conduction between the electrodes. The matrix material may be porous or thinly printed. The matrix material include, for example, highly filled aqueous acrylics, polyvinylidene fluoride (PVDF), PVDF copolymers (e.g., PVDF:HFP), polyacrylonitrile (PAN), and PAN copolymers. The preferred matrix material is the highly filled aqueous acrylics (such as calcium sulfate or calcium carbonate), which are inherently porous due to discontinuities in the polymer coating/film upon drying. The filler preferably comprises at least 80% by weight of the layer. The filler preferably has particle sizes less than or equal to 0.5 microns.

The flexible backing sheet may be any permeable or impermeable substance and may be selected from the group consisting of paper, polyester, polycarbonate, polyamide, polyimide, polyetherketone, polyetheretherketone, polyethersulfone, polyphenolynesulfide, polyolefins (e.g., polyethylene and polypropylene), polystyrene, polyvinylidine chloride, and cellulose and its derivatives.

The instant invention will be better understood with reference to the following example.

EXAMPLE

A 2 cm×2 cm cell was printed using a 2 cm×2 cm faced, smooth rubber pad into a sheet of standard office bond paper and a sheet of polyester film (each having an approximate thickness of about 0.07-0.08 mm). The impact of printing stock were negligible on cell performance, but were noticeable on drying times which were accelerated using forced hot air (e.g., from a hair dryer). Three ink suspensions were prepared. First, a conductive ink suspension was made. This suspension consisted of 79% weight of conductive carbon (particle size<0.1μ) in an acrylic binder (Rohm & Haas HA-8 acrylic binder). A positive electrode (cathode) ink suspension was made. This suspension consisted of 96+% weight of manganese dioxide (particle size<0.4μ) in an acrylic binder (Rohm & Haas HA-8 acrylic binder). A negative electrode (anode) ink suspension was made. This suspension consisted of 96+% weight of zinc powder (particle size<0.3μ) in an acrylic binder (Rohm & Haas HA-8 acrylic binder). The cell had an overall thickness (including the base sheet) of about 0.4 mm. The cell had a 'no load' voltage of about 1.4 volts; a continuous current density of about 0.09 mA/cm$^2$ (the curve is relatively linear and has a flat discharge curve); a capacity of about 2-3 mAh/cm$^2$; a maximum capacity (not sustainable for over 2 milliseconds) of about 6 mA/cm$^2$; an internal resistance (at near discharge) of 3.75-5 ohms/cm$^2$; and an internal resistance (at outset, first 1 minute of use at 0.16 mA drain rate) of 4 ohms.

The present invention may be embodied in other forms without departing from the spirit and the essential attributes thereof, and, accordingly, reference should be made to the appended claims, rather than to the foregoing specification, as indicated the scope of the invention.

That which is claimed:

1. A printed ink cell consisting essentially of:
   a flexible backing sheet;
   a first conductive layer printed on said sheet;
   a first electrode layer printed on said first conductive layer;
   a second electrode layer printed on said first electrode layer; and
   a second conductive layer printed on said second electrode layer;
   wherein each of the first electrode layer and the second electrode layer being printed with an ink having a base selected from the group consisting of acrylics, alkyds, alginate, latex, polyurethane, linseed oil, and hydrocarbon emulsions.

2. The printed ink cell of claim 1 wherein said backing sheet being a porous or nonporous material.

3. The printed ink cell of claim 2 wherein said sheet being selected from the group consisting of paper and plastic sheets.

4. The printed ink cell of claim 3 wherein said plastic sheets being selected from the group consisting of polyester, polyolefins, polycarbonate, polyamide, polyimide, polyetherketone, polyetheretherketone, polyethersulfone, polyphenylsulfide, polystryene, polyvinyl chloride, and cellulose and its derivatives.

5. The printed ink cell of claim 1 wherein printing being selected from the group consisting of screen printing, pad printing, stenciling, offset printing, and jet printing.

6. The printed ink cell of claim 1 wherein each conductive layer being printed with an ink having a base selected from the group consisting of acrylics, alkyds, alginate, latex, polyurethane, linseed oil, and hydrocarbon emulsions.

7. The printed ink cell of claim 1 wherein one electrode being an anode and the other electrode being a cathode, said anode having an active material selected from the group consisting of zinc, magnesium, cadmium, and lithium, and said cathode having a material selected from the group consisting of manganese dioxide, mercury oxide, silver oxide, and other electro-active oxides.

8. A method of making a printed battery consisting essentially of the following steps:
   printing a first conductive layer on a flexible backing sheet;
   printing a first electrode layer on the first conductive layer;
   printing a second electrode layer on the second conductive layer; and
   printing a second conductive layer on the second electrode layer.

9. The method of claim 8 further consisting essentially of curing each layer before printing the next layer.

10. The method of claim 9 wherein curing comprises drying.

11. The method of claim 10 wherein drying comprises the use of force hot air.

* * * * *